(12) United States Patent
Avermeyer et al.

(10) Patent No.: US 11,273,587 B2
(45) Date of Patent: Mar. 15, 2022

(54) EXTRUSION DEVICE AND EXTRUSION METHOD THAT PRODUCES A PLASTIC FILM

(71) Applicant: Windmöller & Hölscher KG, Lengerich (DE)

(72) Inventors: Ansgar Avermeyer, Georgsmarienhütte (DE); Tobias Kulgemeyer, Hagen a.T.W. (DE); Markus Bussmann, Essen (DE); Martin Backmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 15/580,814

(22) PCT Filed: May 10, 2016

(86) PCT No.: PCT/EP2016/060445
§ 371 (c)(1),
(2) Date: Dec. 8, 2017

(87) PCT Pub. No.: WO2016/198223
PCT Pub. Date: Dec. 15, 2016

(65) Prior Publication Data
US 2018/0154568 A1   Jun. 7, 2018

(30) Foreign Application Priority Data

Jun. 8, 2015  (DE) .................... 10 2015 108 976.9

(51) Int. Cl.
*B29C 48/27* (2019.01)
*B29C 48/275* (2019.01)
(Continued)

(52) U.S. Cl.
CPC ........ *B29C 48/271* (2019.02); *B29C 48/2563* (2019.02); *B29C 48/2567* (2019.02);
(Continued)

(58) Field of Classification Search
CPC . B29C 48/271; B29C 48/2567; B29C 48/277; B29C 48/27; B29C 48/2715; B29C 48/297; B29C 48/286; B08B 5/02
See application file for complete search history.

(56) References Cited

U.S. PATENT DOCUMENTS 4,378,897 A * 4/1983 Kattelmann ........... B65D 90/48
198/316.1
4,955,550 A * 9/1990 Satake ............... B01F 15/0445
241/101.4
(Continued)

FOREIGN PATENT DOCUMENTS

DE  20 2004 015 743 U1  2/2006
DE      102011112016 B3 *  1/2013  ........... B08B 9/0813
(Continued)

OTHER PUBLICATIONS

Backmann, Martin, DE 102013100812, Jul. 31, 2014 (Year: 2014).*
(Continued)

*Primary Examiner* — Christopher T Schatz
(74) *Attorney, Agent, or Firm* — DLA Piper LLP (US)

(57) ABSTRACT

An extrusion device that produces plastic film includes at least two feed units that feed feedstock for an extruder, wherein, in each feed unit an automatic cleaning device is arranged for a removal of feedstock from the feed unit when changing material in the extrusion device.

8 Claims, 6 Drawing Sheets

(51) Int. Cl.
*B29C 48/285* (2019.01)
*B29C 48/25* (2019.01)
*B29C 48/08* (2019.01)
*B29C 48/10* (2019.01)
*B29C 48/92* (2019.01)
*B29B 7/60* (2006.01)

(52) U.S. Cl.
CPC ........ *B29C 48/2692* (2019.02); *B29C 48/277* (2019.02); *B29C 48/286* (2019.02); *B29B 7/603* (2013.01); *B29C 48/08* (2019.02); *B29C 48/10* (2019.02); *B29C 48/92* (2019.02); *B29C 2948/9298* (2019.02); *B29C 2948/92333* (2019.02); *Y02P 70/10* (2015.11)

(56) References Cited

U.S. PATENT DOCUMENTS

| | | | | |
|---|---|---|---|---|
| 5,127,450 | A | * | 7/1992 | Saatkamp ........... B29B 17/0005 141/9 |
| 5,683,632 | A | * | 11/1997 | Shimizu .................. B29B 7/244 264/40.4 |
| 2006/0097421 | A1 | * | 5/2006 | Terada .................... B29C 48/27 264/211.21 |
| 2013/0105526 | A1 | * | 5/2013 | Ross ..................... B29B 13/022 222/630 |
| 2014/0338534 | A1 | * | 11/2014 | Stirner ...................... B29B 7/86 95/266 |
| 2015/0367553 | A1 | | 12/2015 | Backmann et al. | |

FOREIGN PATENT DOCUMENTS

| | | |
|---|---|---|
| DE | 10 2013 100 812 A1 | 7/2014 |
| EP | 0 318 170 A2 | 5/1989 |
| JP | 57-178734 A | 11/1982 |
| JP | 6-39835 A | 2/1994 |
| JP | 08033822 A * | 2/1996 |

OTHER PUBLICATIONS

Usami, Hiroshi, English translation of JP-08033822-A, Feb. 1996 (Year: 1996).*
Bollschweiler Reinhold, English machine translation of DE-102011112016-B3, Jan. 2013 (Year: 2013).*
International Search Report dated Aug. 12, 2016, of corresponding PCT/EP2016/060445, along with an English summary.
Rule 66 PCT Communication dated May 18, 2017, of corresponding PCT/EP2016/060445, along with an English summary.
International Preliminary Report on Patentability dated Sep. 19, 2017, along with an English translation of the International Preliminary Report on Patentability dated Dec. 21, 2017.
First Office Action dated Aug. 5, 2019, of counterpart Chinese Application No. 201680031735.8, along with an English Summary.
Second Office Action dated Jun. 3, 2020, of counterpart Chinese Application No. 201680031735.8, along with an English translation.
European Office Action dated Jul. 7, 2020, of counterpart European Application No. 16722175.3, along with a Summary of Office Action in English.

* cited by examiner

EXTRUSION DEVICE AND EXTRUSION METHOD THAT PRODUCES A PLASTIC FILM

TECHNICAL FIELD

This disclosure relates to an extrusion device that produces a plastic film as well as to a method of cleaning such an extrusion device.

BACKGROUND

It is known that extrusion devices are provided to produce plastic films. A large variety of products can thereby be produced successively one behind the other sequentially on such extrusion devices. For the change between different products, the materials need to be changed so that in the case of feed units, which hold feedstock available inside the extrusion device, the extrusion device also needs to be replaced by a corresponding subsequent material. The discharge of feedstock and infilling of the subsequent material is also identified as changing the material.

In known solutions, it is disadvantageous that cleaning the feed unit is often necessary or is mandatory, respectively, after discharging the feedstock. To carry out cleaning, a partial disassembly of the feed unit is typically carried out and the individual components of the feed unit are cleaned by the machine operating personnel, in particular with compressed air or other manual cleaning means. This leads to a very large expenditure of time in carrying out the cleaning and thus to a significant extension of the entire change time to change material. Last but not least, this has the result that no guarantee that the cleaning has in fact been carried out with the desired quality can be given due to the purely manual cleaning.

It could therefore be helpful to improve the cleaning of the extrusion device in a cost-efficient and simple manner when changing the material.

SUMMARY

We provide an extrusion device that produces plastic film including at least two feed units that feed feedstock for an extruder, wherein, in each feed unit an automatic cleaning device is arranged for a removal of feedstock from the feed unit when changing material in the extrusion device.

We also provide a method of cleaning the extrusion device, including identifying a cleaning objective, activating the cleaning device in at least one selected feed unit of the extrusion device to execute a cleaning program, and generating a conclusion signal after completion of the cleaning program.

Figure 1:
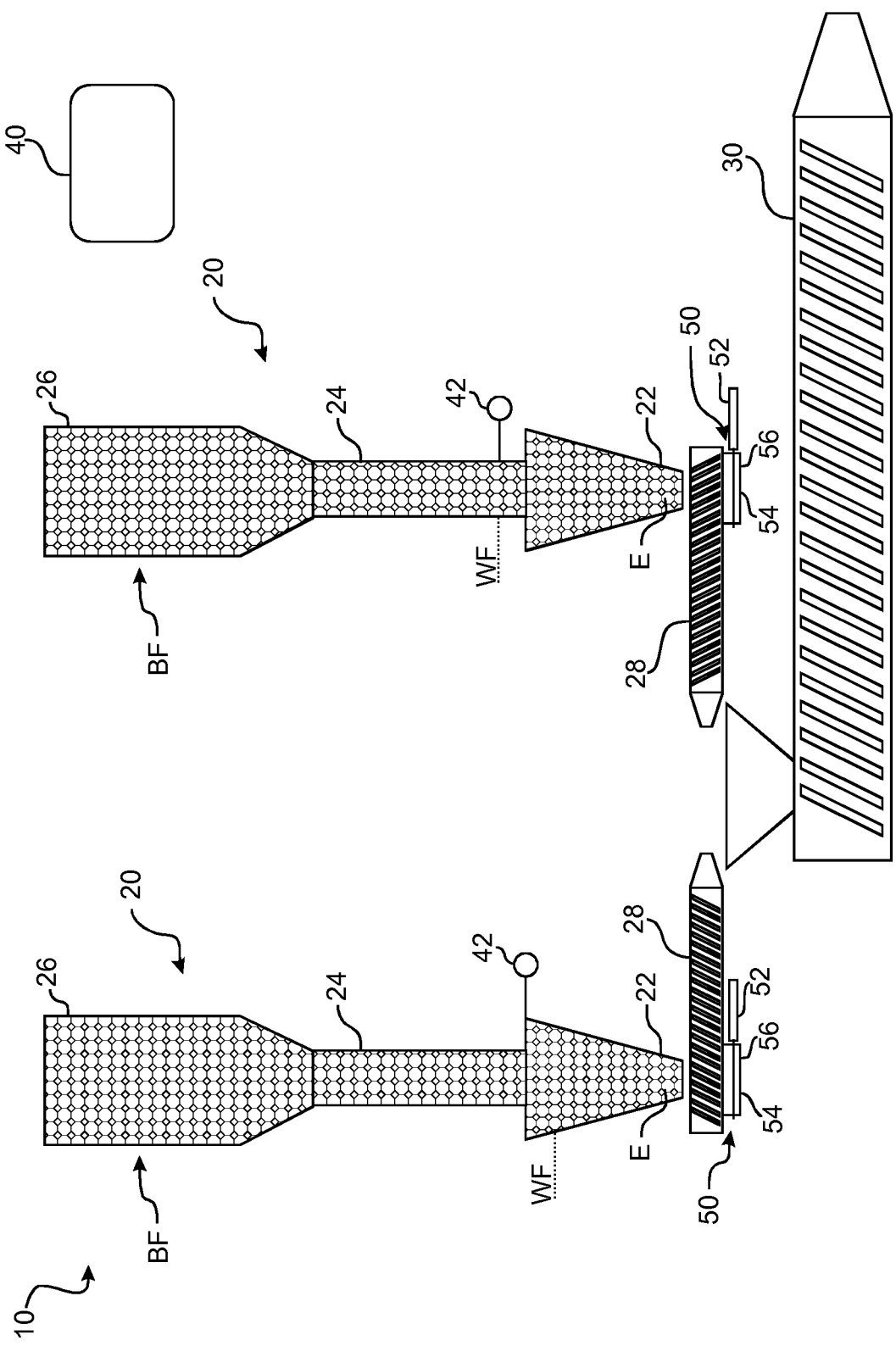
FIG. 1 schematically shows an example of an extrusion device in the operating state.

LIST OF REFERENCE NUMERALS 10 extrusion device
20 feed unit
22 weighing funnel
23 funnel opening
24 down pipe
26 feed container
28 dosing screw
30 extruder
32 emergency sensor
40 control device
42 filling level sensor
50 discharge opening
52 discharge closure
54 container interface
56 sensor device
58 opening sensor
60 discharge container
62 discharge volume
70 return device
80 cleaning device
82 cleaning agent
84 dust sensor
E feedstock
BF operating filling level
WF changing filling level
F filling level
RR cleaning direction
AR discharge direction

DETAILED DESCRIPTION

Our extrusion devices produce plastic film. For this, the extrusion device has at least two feed units that feed feedstock for an extruder. An automatic cleaning device is thereby arranged in each feed unit for removal of feedstock from the feed unit when changing material in the extrusion device.

In contrast to known solutions, a defined cleaning result can be obtained by using an automatic cleaning device. Provision can thus be made for an automation providing an automatic cleaning with the help of the automated cleaning device. While changing the material, thus in particular in the meantime after the discharge of a feedstock and prior to filling with a subsequent material, the automatic cleaning process can thus be carried out with the help of the automatic cleaning device.

In addition to a defined cleaning result, the time period for carrying out such a cleaning will also be significantly lower than when carrying it out manually, because disassembly or partial disassembly of the feed unit is no longer necessary. In fact, the automatic cleaning device also remains at the desired cleaning location during normal operation of the extrusion device so that the cleaning routine can be started immediately after discharging the feedstock.

Last but not least, the actual performance of cleaning is monitored in addition to a defined cleaning result and the automation and time savings associated therewith so that a different cleaning performance can be specified and verified not only quantitatively, but also qualitatively by a corresponding routine.

A cleaning device can thus have one or a plurality of cleaning means providing a corresponding cleaning function at one or at different locations. In addition to purely mechanical cleaning processes in the form of moving brushes or worm drives, provision is in particular made for nozzle devices, which, as compressed air nozzles, are associated with the corresponding cleaning functionality. Such a cleaning device is in particular combined with a discharge opening, which will be discussed later, to discharge feedstock so that the cleaning process does not only correspond to transporting of the feedstock, but to discharging and outputting of the feedstock. The corresponding cleaning program is thus in particular carried out when a corresponding discharge opening that discharges and decontaminates feedstock is open towards the bottom.

It may be advantageous when, in an extrusion device, the cleaning device has at least one cleaning means comprising a cleaning direction along a discharge direction of the feed unit. A discharge direction of the feed unit is defined as the direction along which the feedstock is to be discharged. In a feed unit, this discharge direction can preferably oftentimes be oriented along a direction of gravity so that outputting for the discharge of the feedstock is provided with the help of the force of gravity. Orientation of the cleaning direction along a discharge direction is in particular provided with an angularity, wherein the cleaning direction and the discharge direction draw a maximum angle of 0° to approximately 30° with one another. This range is preferably 0° to 15°. An angularity of approximately 0° to approximately 5° is particularly preferred for an orientation of the cleaning direction along a discharge direction. The orientation of the cleaning means with a cleaning direction along a discharge direction makes it possible to strengthen or improve, respectively, cleaning in the direction of the discharge opening. The cleaning means thus accelerates all individual granules of feedstock in a direction, which substantially corresponds to the discharge direction. As a result, the dwelling time of the granules of the feedstock to be decontaminated is reduced significantly during the cleaning process. The reduction of this dwell time, in turn has the result that cleaning performance is increased and the necessary cleaning time for the identical cleaning performance is reduced at the same time. The entire cleaning process can thus be carried out with a higher cleaning quality within a shorter time period.

It is also advantageous when, in an extrusion device, the cleaning device has at least one cleaning means comprising a cleaning direction at an acute angle to an inner wall of the feed unit. The feed unit typically has different components. This can be a feed container, a down pipe and/or a weighing funnel, for example. Depending on the actual component, the inner walls can be oriented differently from the direction of the force of gravity when installed. Formation of a cleaning means comprising a cleaning direction at an acute angle to an inner wall has the result that a corresponding cleaning force also strikes against the inner wall at an acute angle. This applies in particular in forming the cleaning means in the form of a compressed air nozzle so that a corresponding stream of compressed air strikes against the inner wall substantially at an acute angle. This, in turn, has the result that a correspondingly high cleaning effect is provided at the point of impact, but also at the surrounding areas of this inner wall. A cyclonic stream, which makes it possible to even further improve the cleaning performance and in particular provide a specific and defined removal of the decontaminated granules of the feedstock in the direction of a discharge direction, is created in particular by the corresponding acute angle. Such a cleaning means comprising a corresponding acute angle can also be a cleaning ring. This acute angle is open to the bottom, in particular approximately 35°.

It is further advantageous when, in an extrusion device, the feed unit in each case has a weighing funnel, a down pipe and/or a dosing screw, wherein the cleaning device has at least one cleaning means in the weighing funnel, in the down pipe and/or in the area of the dosing screw. Provision is in particular made at two or also even at all locations for the corresponding cleaning means of the cleaning device. As has already been suggested, individual components comprising different functionalities can provide the feed functionality of the feed unit. Granules of the feedstock can thus also be arranged in all of the components of the feed unit, even after the general discharge of the feedstock has been completed. To output these last granules and avoid a correspondingly unwanted contamination in the subsequent product and thus in the subsequent material, provision is made in particular in all relevant or preferably in all available components of the feed unit, respectively, for corresponding cleaning means. With regard to their geometry, orientation and actual functionality, respectively, these cleaning means can be adapted specifically for the respective location of the cleaning. In addition to the described components, individual mechanical engagement components, for example, in the form of a closure bucket can be arranged below the down pipe with their own cleaning means of the cleaning device.

It is further advantageous when, in an extrusion device, the cleaning device has at least one cleaning means in the form of a compressed air nozzle. A compressed air nozzle is a particularly simple and cost-efficient example of such a cleaning means. The compressed air nozzle can in particular obtain the correspondingly required compressed air for the cleaning from a compressed air supply network, which is typically present on a manufacturing site. Switching a corresponding compressed air valve has the result that the cleaning can be turned on and off at will. In addition to valves, which switch in a purely qualitative manner, flexible valves, or valves, that switch qualitatively respectively, are also possible so that a different cleaning functionality, preferably comprising different cleaning qualities, can be switched. In the context of the compressed air nozzle, this means, for example, that different cleaning programs can be provided with different compressed air intensities or different numbers and durations of blasts of compressed air, respectively.

A further advantage can be attained when, in an extrusion device, at least two feed units have at least one discharge opening, comprising a discharge closure that opens and closes the discharge opening, and a container interface for the reversible fastening of a discharge container that accommodates feedstock, which is discharged from the respective feed unit, wherein an opening sensor is provided to identify the position of the discharge opening. This means that the discharge opening in particular forms the lower closure of the feed unit so that substantially the totality of the feedstock can be output through the discharge opening. A particularly simple and cost-efficient solution for the discharge of the feedstock and the subsequent cleaning of the feed unit takes place thereby. The discharge opening is thus also crucial for the orientation of the discharge direction and the correspondingly described correlation options for the cleaning direction of the individual cleaning means. In this example, it is advantageous when a corresponding identification of the position of the discharge opening is carried out in the opening sensor. The cleaning can now be started, stopped or modified as a function of this information from the opening sensor. For example, cleaning steps are possible that are only sensible in a closed discharge opening. This can be, for example, to create deliberate swirl effects inside the feed unit when a swirling of deposited dust, dirt or granules of the feedstock is desired. For the actual outputting during cleaning, it is necessary for the discharge opening to be open so that a corresponding sensor signal can be awaited, when such an opening sensor provides this information. It can thus be avoided that an outputting of the cleaning is carried out when the discharge opening in the closed state would still oppose such an outputting. Last but not least, it is also possible for a further sensor system to identify the presence of a container at the container interface of a discharge opening so that an unwanted outputting into the open environment next to the extrusion device is effectively avoided. Individual sensors are thereby just as possible as tapping a setpoint value for the valve position of a corresponding closure of the discharge opening. In particular these examples are thereby based on the secondary components of an extrusion device, wherein a main component is arranged centrally inside the secondary components and equipped without such a discharge opening. This leads to a further improved cleaning situation because the correlation to the discharge opening can substantially be forgone inside the main component.

It is also advantageous when, in an extrusion device, the extruder has an emergency sensor that identifies an undersupply of the extruder with feedstock to cancel the cleaning program with the cleaning device of at least one feed unit. This means that it is identified when the buffer effect is no longer sufficient to load the extruder with sufficient material. To withhold material for the extrusion from a hot extruder can result in serious effects including defects in the extruder. It should thus be avoided in any event that such a draining takes place. When an emergency sensor identifies that such a draining is possible, the cleaning program can be cancelled in at least one feed unit so that, in the emergency situation, the feed unit starts to refill material again as emergency feed unit, even though the cleaning process had not been completed yet. This has the result that even though the feed unit needs to be processed again with regard to changing the material and the cleaning process, the extruder has been protected with regard to unwanted defects or damage. Such an emergency sensor can, for example, be equipped or embodied, respectively, as filling level sensor in a mixing chamber directly upstream of the extruder.

It is also advantageous when, in an extrusion device, the cleaning device has a dust sensor that identifies a dust load inside the respective feed unit for selecting different cleaning programs of the cleaning device. This means that dust, which deposits inside the feed unit, can accumulate inside the extrusion device from the granulate during the normal operation. To output the dust, because such dust may also represent contamination of the subsequent material, such a dust sensor is present, which can reliably identify the dust of components, for example, by measuring transmission or weight. Depending on the actually identified dust load, a different selection of different cleaning programs can now be made thereby so that work can be carried out, for example, with different compressed air intensities at different compressed air nozzle positions, depending on the dust load.

It may also be advantageous when, in an extrusion device, the feed unit has a dust protection against an escape of dust from the feed unit. This dust protection can in particular be arranged in the area of a weighing funnel in the transition to a dosing screw of the feed unit. Such a dust protection can thereby in particular be attached in a reversible manner so that it is a filter cloth, for example. Avoidance of the escape of dust has the result that in particular the surrounding area around the extrusion device is protected against contamination. This dust protection is particularly advantageous, in particular while carrying out the cleaning because the cleaning functionality in this case equals stirring up dust inside the feed unit and because the risk that dust escapes would be increased significantly through this.

Our method of cleaning an extrusion device comprises the following steps:
  identifying a cleaning objective,
  activating a cleaning device in at least one selected feed unit of the extrusion device to execute a cleaning program, and
  generating a conclusion signal after completion of the cleaning program.

The method is associated with the same advantages, as they have been discussed in detail with regard to an extrusion device. The cleaning objective can thereby be provided actively as well as automatically. The cleaning steps can thus be started automatically, for example, in the course of changing the material, after identifying the final output of the feedstock from the feed unit under various general conditions. A manual activation, for example, by manually operating a triggering command by a machine operator is also possible.

It is also advantageous when, in our method, the cleaning device has at least two cleaning means at different locations of a feed unit, wherein the cleaning means are activated consecutively in the cleaning program in the direction of the discharge direction of the feed unit. An overlap in time may also be possible thereby. It is possible in this way to carry out the cleaning steps in the direction of the discharge direction, thus in particular in the direction of the force of gravity from top to bottom. The cleaning will thus start at the uppermost end of the feed unit and will slowly work its way towards the bottom. In the feed container, compressed air can thus be applied first to compressed air nozzles, for example, to start with the decontamination towards the bottom at that location. A decontamination below the feed container now takes place in parallel or subsequently, for example, in the down pipe and subsequently in the weighing funnel. A contamination during the cleaning towards the top is avoided substantially completely and effectively in this way.

It is also advantageous when, in our method, the cleaning device has at least one cleaning means in the form of a compressed air nozzle, wherein, in the context of the cleaning program, the compressed air nozzle emits at least two bursts of compressed air one after the other. Three or more bursts of compressed air are also possible. The pause between the bursts of compressed air is also a possibility of variation to be able to differentiate different cleaning programs from one another. It is crucial thereby, with which compressed air intensity, with what number of bursts of compressed air and with which pause between the bursts of compressed air work can be performed. Depending on the size, dust load and residual number of granules at the feedstock, a large variety of combinations of the above-described parameters can thereby have the optimal cleaning functionality.

It is also advantageous when, in our method, the feed units each have a dosing screw operated backwards in the course of the cleaning program. It must be ensured that a further contamination of a mixing chamber following the dosing screw with feedstock is prevented. For this purpose, the dosing screw is operated backwards and residual feedstock, still located therein, is moved back in the direction of a discharge opening in this way so that an output of this dosing screw also takes place there. The dosing means can also be understood as drive here, which provides the backward movement of the dosing screw.

Further advantages, features and details follow from the description below, in which examples are described in detail by referring to the drawings. The features mentioned in the appended claims and in the description can thereby be significant, in each case alone or in any combination.

FIGS. 1 to 5 show an extrusion device 10 comprising two feed units 20. Both feed units 20 are equipped with a feed container 26, a down pipe 24 and a weighing funnel 22. Our method can be carried out and a cleaning can be capable of being controlled by a control device 40.

FIG. 1 shows the operating state with an operating filling level BF in the feed units 20. The feedstock E is thereby fed to the extruder 30 via dosing screws 28 and refilled into the respective feed unit 20 in response to the lowering below the operating filling level BF of the fill level F.

Figure 2:
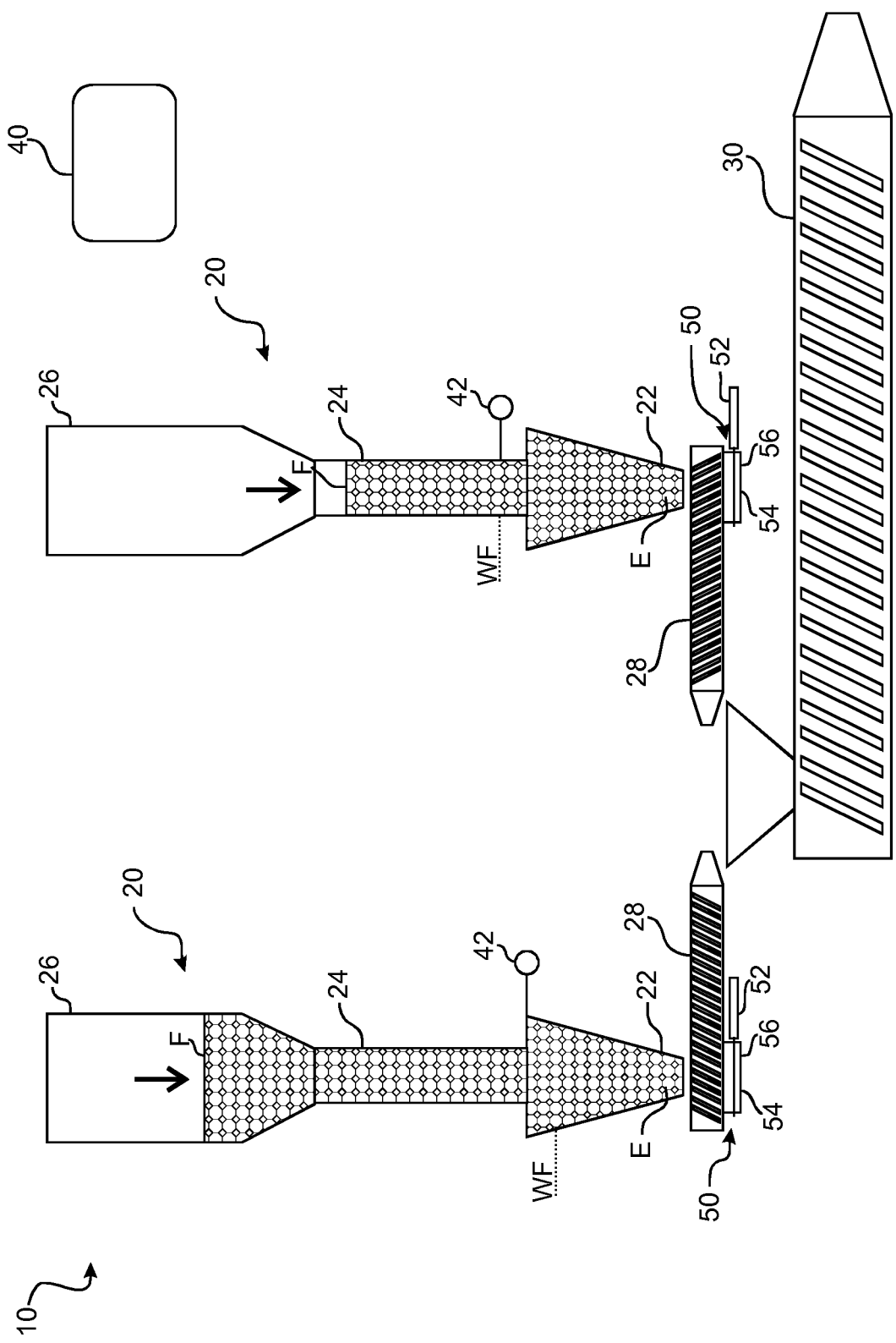
FIG. 2 schematically shows the example of FIG. 1 during the lowering of the filling levels.
Figure 3:
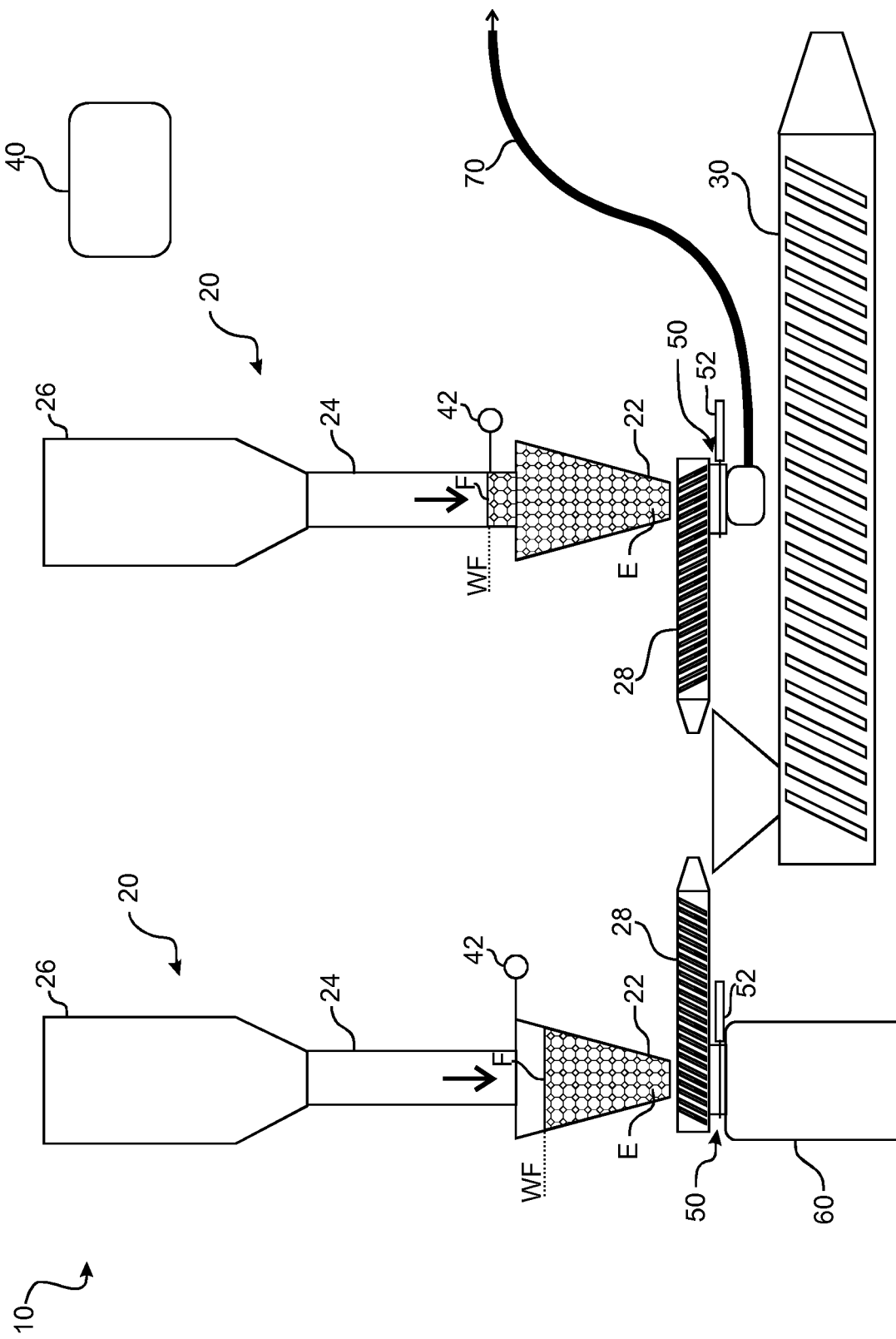
FIG. 3 schematically shows the example of FIGS. 1 and 2 after the lowering to a changing filling level.
Figure 4:
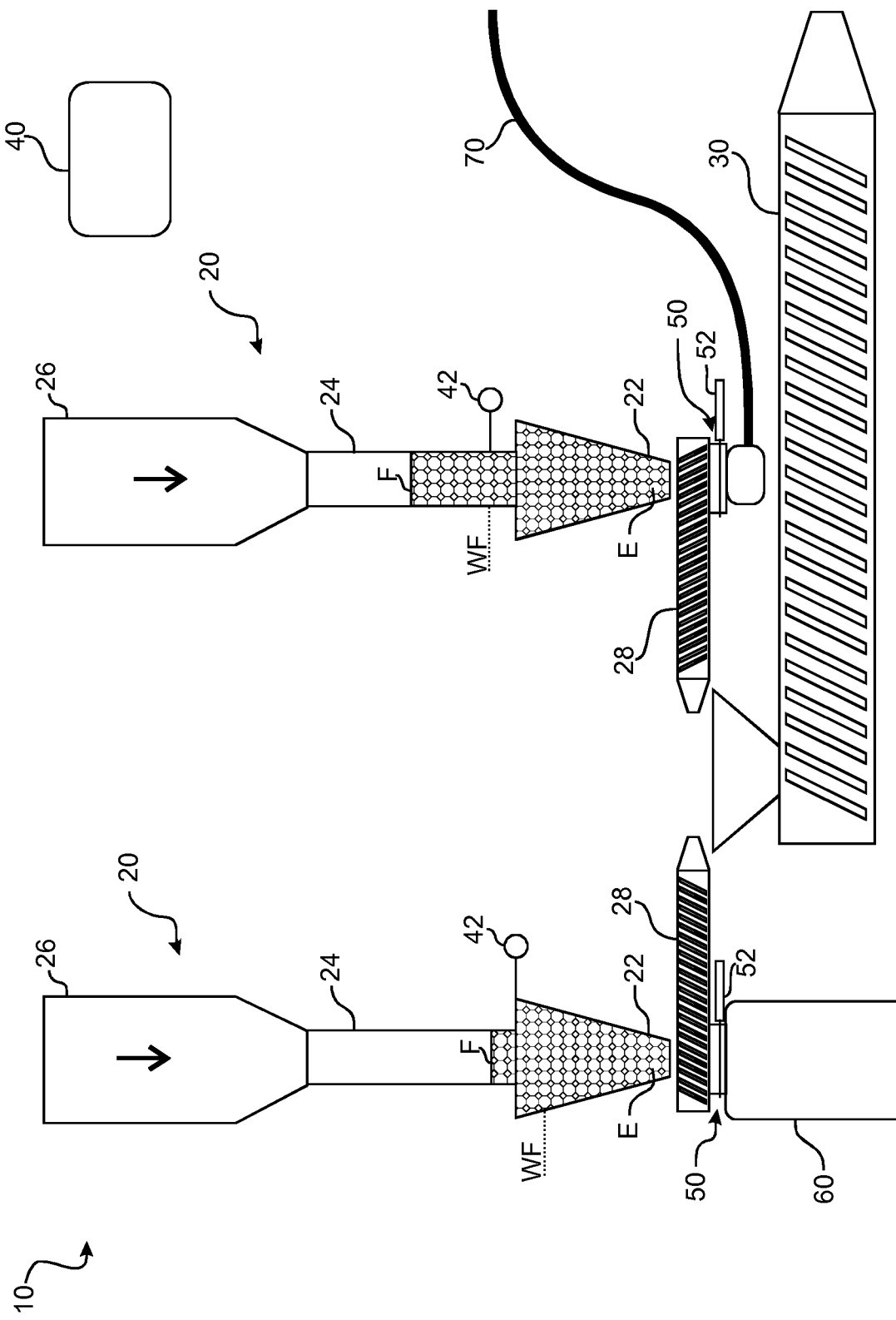
FIG. 4 schematically shows the example of FIGS. 1 to 3 while maintaining the changing filling level.
Figure 5:
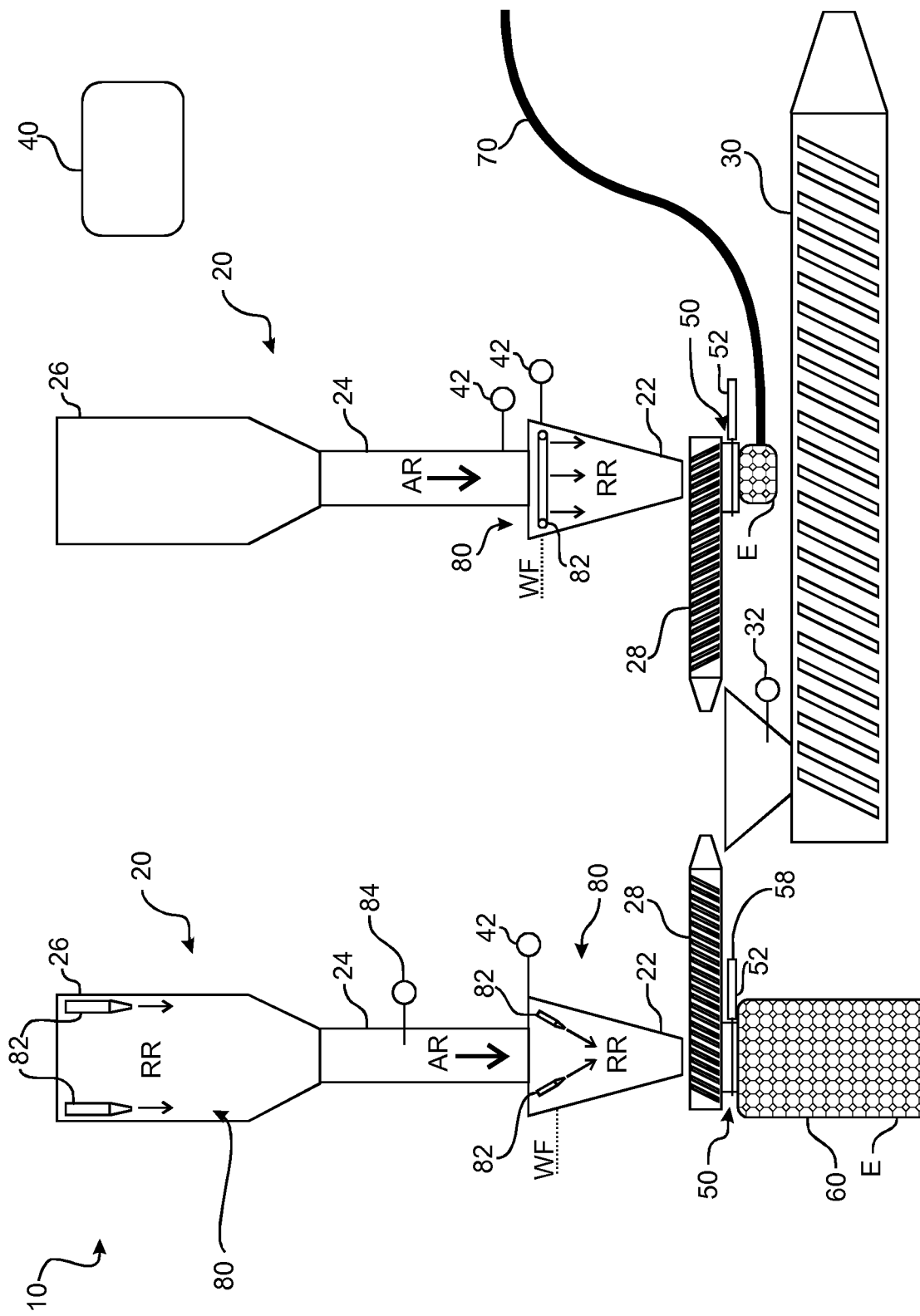
FIG. 5 schematically shows the example of FIGS. 1 to 4 during a cleaning process.

If changing the material is now desired, the filling level F can be lowered as a preparatory measure, as it is illustrated as snapshot in FIG. 2. This takes place in a simple manner by omitting the further refilling processes so that the filling levels F are lowered to the bottom in the direction of the arrow according to FIG. 2 by the further production of the extruder 30. The control device 40 permits lowering, until changing filling levels WF according to FIG. 3 have been reached. These changing filling levels WF identify a reduced buffer situation in which a quicker change, which is provided with less scrap material, can take place. Either a discharge container 60 or a return device 70 is attached to a corresponding discharge opening 50 at this point in time so that a discharge of the feedstock E can now take place via a corresponding container interface 54 and an opening of the discharge closure 52. This is in particular coupled to an opening sensor so that a discharge does in fact only take place when an open discharge closure 52 is identified as well. As soon as the discharge has been carried out completely, a situation according to FIG. 5 is reached. Both feed units 20 are now substantially empty, but still contaminated with residual dust and residual granules from the feedstock E. Different cleaning means 82 of a cleaning device 80 are illustrated schematically in FIG. 5. Each of these cleaning means 82 has cleaning directions RR that have different correlations. On the left-hand side, FIG. 5 thus shows compressed air nozzles as cleaning means 82 comprising a cleaning direction RR along the discharge direction AR towards the bottom in the feed unit 20 in the feed container 26 and thus a cleaning option from the top to the bottom. The dust load within the feed unit 20 can additionally be identified with the help of the dust sensor 84. Provision is made in the weighing funnel 22 for compressed air nozzles that are engaged, as cleaning means 82, and accordingly provide an angular impact at an acute angle and thus the production of a cyclone as cleaning direction RR inside the weighing funnel 22. In the right feed unit 20, provision is made only in the lowermost weighing funnel 22 for an annular compressed air nozzle, which acts as cleaning means 82. The cleaning direction RR is again oriented in the discharge direction AR, but it is thus arranged annularly to the engaged conical walls of the weighing funnel. A decontamination to the bottom and a simultaneous impact and intensified cleaning of the walls of the weighing funnel 22 can be provided in this manner.

Figure 6:
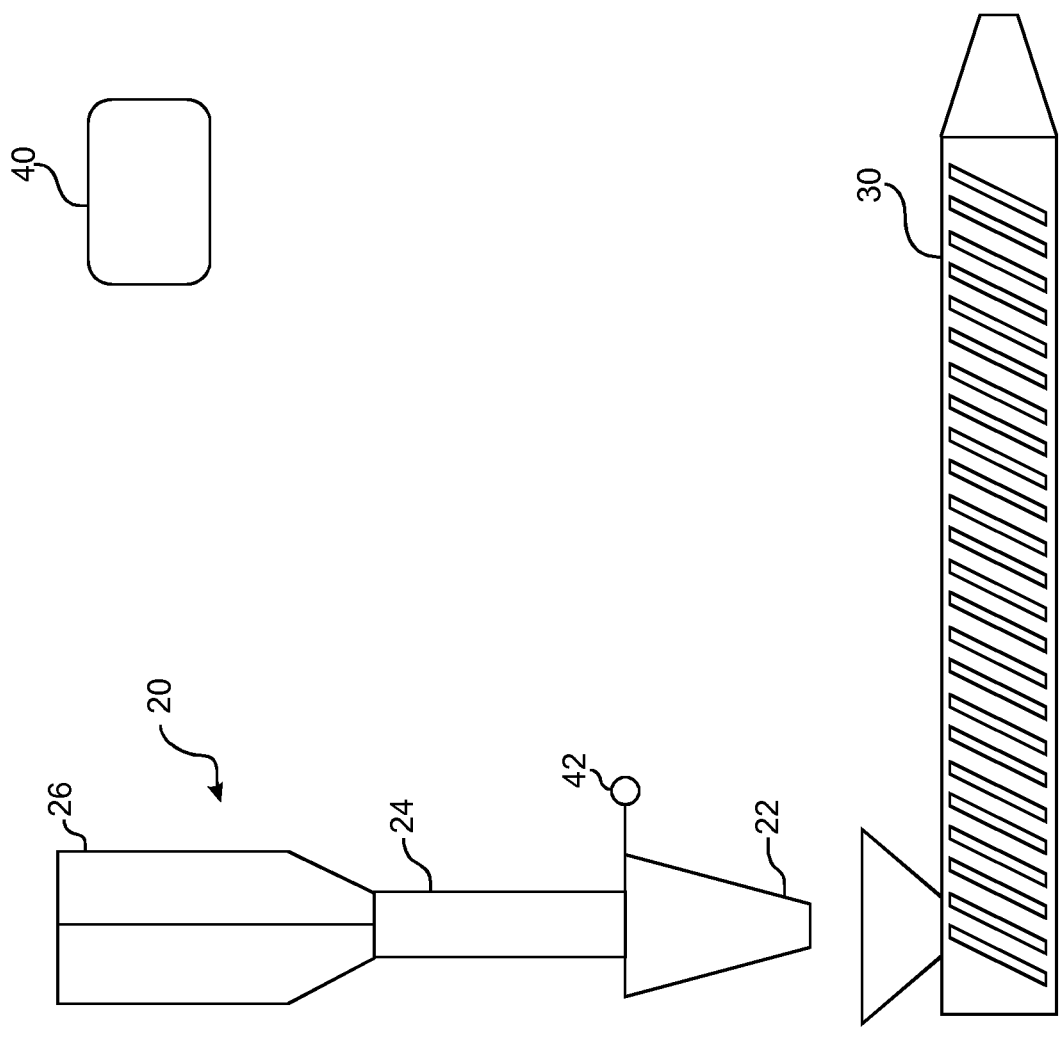
FIG. 6 schematically shows an alternative example of an extrusion device.

FIG. 6 shows an alternative example of an extrusion device 10. With regard to the advantages described above, the extrusion device is based on the example of FIG. 1, but differs in the refilling function. Provision is thus made for a so-called "batch" process for the refilling. The feed container 26 is equipped with separate volumes so that each volume of the feed container 26 can be understood to be a feed unit 20. Components in the form of the down pipe 24 and of the weighing funnel 22 arranged therebelow are thus common components of the different feed units 20. Provision is made below the weighing funnel 22 for a mixing funnel, in particular comprising a mixer drive that allows for homogenization prior to entering the extruder.

The above discussion of the examples describes our devices and methods only in the context of examples. Individual features of the examples, if technically expedient, can be combined freely with one another, without departing from the scope of the appended claims.

Features and details described in connection with the extrusion device shall thereby also apply in connection with the method and in each case vice versa so that, with regard to the disclosure, reference is or can mutually always be made, respectively, to the individual structural or step aspects.

The invention claimed is:

1. An extrusion device that produces plastic film comprising at least two feed units that feed feedstock for an extruder by separately discharging feedstock from each feed unit into the extruder wherein, in each feed unit an automatic cleaning device is arranged for a removal of feedstock from the feed unit when changing material in the extrusion device, wherein the cleaning device of each feed unit has at least two cleaning means at different locations of each feed unit, and the cleaning means are arranged consecutively in direction of a discharge direction of the feed unit;
   wherein the feed unit comprises a weighing funnel, a down pipe and a dosing screw;
   the cleaning device comprises at least one cleaning means in the weighing funnel, in the down pipe and in an area of the dosing screw;
   the dosing screw is configured to operate backwards in the course of cleaning; and
   the feed unit has a dust protection against an escape of dust from the feed unit, the dust protection being arranged in an area of the weighing funnel transitioning to the dosing screw.

2. The extrusion device according to claim 1, wherein the at least two cleaning means comprise a cleaning direction along a discharge direction of the feed unit.

3. The extrusion device according to claim 1, wherein the at least two cleaning means comprise a cleaning direction at an acute angle to an inner wall of the feed unit.

4. The extrusion device according to claim 1, wherein the at least two cleaning means are in the form of a compressed air nozzle.

5. The extrusion device according to claim 1, wherein each of the at least two feed units have at least one discharge opening comprising a discharge closure that opens and closes the discharge opening, and a container interface for a reversible fastening of a discharge container to accommodate feedstock discharged from the respective feed unit, and an opening sensor is provided to identify a position of the discharge opening.

6. The extrusion device according to claim 1, wherein the extruder has an emergency sensor that identifies an undersupply of the extruder with feedstock to cancel a cleaning program with the cleaning device of at least one feed unit.

7. The extrusion device according to claim 1, wherein the cleaning device has a dust sensor that identifies a dust load inside the respective feed unit to select different cleaning programs of the cleaning device.

8. An extrusion device that produces plastic film comprising at least two feed units that feed feedstock for an extruder, wherein, in each feed unit an automatic cleaning device is arranged for a removal of feedstock from the feed unit when changing material in the extrusion device, and the cleaning device has at least one cleaning means comprising a cleaning direction at an angle of 0° to 30° to a discharge direction of the feed unit, wherein the cleaning device of each feed unit has at least two cleaning means at different locations of each feed unit, the cleaning means are arranged consecutively in direction of a discharge direction of the feed unit; and the feed unit has a dust protection against an escape of dust from the feed unit, the dust protection being arranged in an area of the weighing funnel transitioning to the dosing screw.

\* \* \* \* \*